May 20, 1924.

C. P. MÜLLER 1,494,795

STEREOSCOPIC PROJECTION OF MOTION PICTURES

Filed May 11, 1920

INVENTOR
Charles P. Müller
BY
ATTORNEY

Patented May 20, 1924.

1,494,795

UNITED STATES PATENT OFFICE.

CHARLES P. MÜLLER, OF BRONX, NEW YORK.

STEREOSCOPIC PROJECTION OF MOTION PICTURES.

Application filed May 11, 1920. Serial No. 380,553.

*To all whom it may concern:*

Be it known that I, CHARLES P. MÜLLER, a citizen of the United States, and a resident of 3153 Decatur Ave., Bronx, in the county of Bronx and State of New York, have invented certain new and useful Improvements in Stereoscopic Projection of Motion Pictures, of which the following is a specification.

The invention relates to a method of projecting motion and other pictures in manner to give stereoscopic effects; and it has for its object a novel arrangement of the pictures on a strip or film as well as a novel method of producing such strip or film.

In the projection of pictures by means of an advancing strip or film it is well understood that the retina of the eye will retain for a sufficiently long period impressions received from a number of pictures displayed consecutively so that, in accordance with the present invention, a pair of dissimilar but matched pictures taken from different view points may be successively projected to give a stereoscopic effect.

In the accompanying drawings which illustrate diagrammatically the manner of producing a stereoscopic strip or film—

Similar characters of reference designate corresponding parts thruout the several views.

Figure 1:
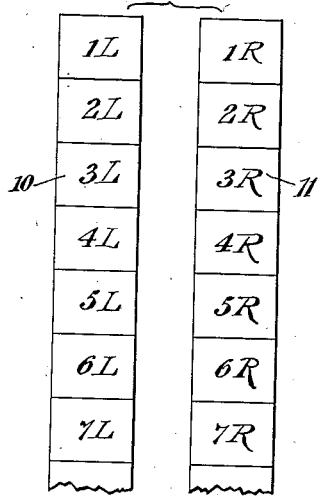
Fig. 1 shows an arrangement of the pictures on the negatives first obtained.

Referring to the drawings, a film or strip of any standard or special type may be employed; and, in accordance with the invention, two such negative films 10 and 11 are exposed simultaneously to photograph the same object or scene from different points. The said films are fed forward in well-known manner by any suitable camera apparatus (not shown) to provide a series of pictures 1 L, 2 L, 3 L, etc., and 1 R, 2 R, 3 R, etc., respectively arranged longitudinally and successively on the said films 10 and 11. It is essential, however, that the exposure of two corresponding pictures 1 L and 1 R, as hereinafter more particularly set forth, shall be made simultaneously. I am aware that it has been proposed heretofore to expose a film from different points but alternately, more particularly in connection with color cinematography; also, to provide successive pictures, one of each pair of which pictures consists of two partial views of the same subject taken from a different point. However, such expedients do not produce the desired result; for, to secure proper stereoscopic effect, the two corresponding pictures taken from different points must not only be simultaneously produced but be matched as hereinafter set forth. In other words, the two matching pictures 1 L and 1 R are taken simultaneously from different view points and are arranged in corresponding pairs on a common single strip of positive film 12 or 13, Figs. 2 and 3 and in succession, that is to say longitudinally of the film—one picture of a pair being first projected and then the other. For example, the arrangement may be as 1 L, 1 R, 2 L, 2 R, etc.; or, the picture taken from the right hand side may be arranged first on the film, whereupon the series will become 1 R, 1 L, 2 R, 2 L, etc. It is quite immaterial, also, whether the right or the left hand picture be at the beginning.

Figure 2:
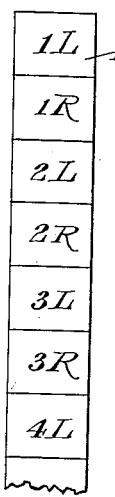
Figs. 2 to 4 illustrate one method of effecting a positive therefrom.
Figure 3:
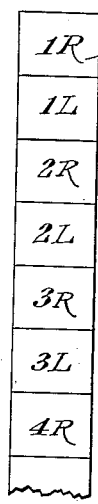
Figure 4:
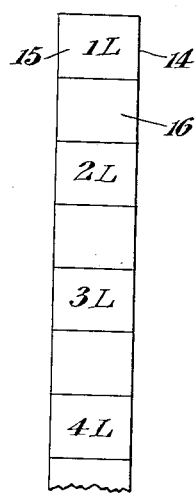

In the printing of the positive to produce a film as shown in Figs. 2 or 3, various expedients may be resorted to. For example, as shown in Fig. 4, a strip of positive film 14 may be printed with alternate exposed and unexposed portions 15 and 16 respectively, the film strip 14 then being first made from the negative film 10. Thereupon, the negative 11 is used and the exposures made in the unexposed spaces, it being understood, of course, that in this procedure the positive is to be fed twice as fast as the negative. It is to be understood, also, that the particular manner set forth of producing a positive may be varied and that, as hereinbefore stated, the particular sequence of the pictures of a pair is not essential providing the numerical sequence set forth be maintained.

Figure 5:
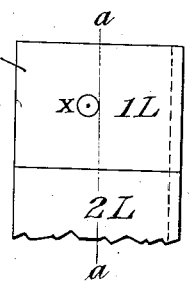
Figs. 5, 6 and 7 illustrate a method of effecting coincidence of corresponding points in a particular focal plane.
Figure 6:
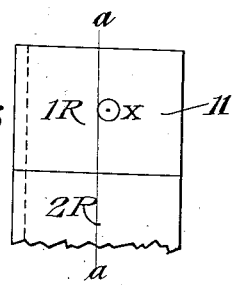
Figure 7:
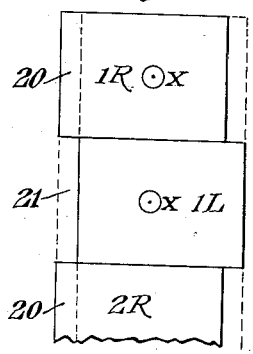

However, it is essential that the pictures as printed on the positives 12 or 13 are aligned longitudinally of said film in order to bring corresponding points of each picture of a pair of pictures and substantially for a given focal plane into exact coincidence. To effect this result, it is necessary to laterally displace each picture 1 L, 1 R, etc., toward the median line of the operative film or positive, since the two pictures have been viewed from displaced or separated points. For example, a point X on the film negative 10, as shown in Fig. 5, which appears on the one side of the median line $a$—$a$ may appear on the opposite side on the negative 11, Fig. 6. Therefore, it becomes necessary in printing to laterally shift, or mask, each film so that when superposed in the projection, as indicated in Fig. 7, the projected image of the point X from the two pictures 1 L and 1 R of a pair will coincide. It will be understood, of course, that this is strictly true only for a particular focal plane, or plane in proximity thereto, but as the projection of motion pictures is usually of subjects taken in substantially one particular plane, the projection will not be impaired. However, I have found that this disturbing factor of different depth or focal plane may be minimized by somewhat reducing, in manner well understood in the art, the period of projection of one picture of a pair, so that only a slight effect thereof will be utilized, but which will nevertheless make sufficient impression upon the retina to give the desired stereoscopic effect. This expedient, however, is not essential.

Figure 8:
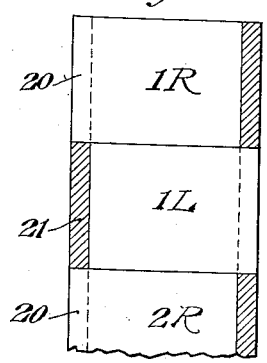
Fig. 8 is a diagrammatic view illustrating the method of retaining the effective width of the film.

Positives will thus be obtained from which stereoscopic projection may be had by running the film or other strip of positive thru a suitable projector, although it will be appreciated that if the negatives 10 and 11 are made with the standard width of film the effective width of picture of the positive will be somewhat less owing to the masking or displacement of the individual pictures, as hereinbefore set forth. This may be overcome by rendering opaque the masked portions of the positive, whether at the left or right side of the particular picture, leaving the eye to retain the impression created by the previously shown picture over the dark space which will be projected by the masked opaque portion of the ensuing picture. For example, reference being had more particularly to Figs. 7 and 8, it will be noted that the consecutive pictures 1 R, 1 L, are laterally displaced with reference to each other and that the strip 20 of the one series of pictures is matched by a corresponding blank space 21 of the other series. I have found that by rendering opaque the portion 21 of the film as in exposing same to light, that the image or portion of the picture 20 will persist in the retina during the interval required for the portion 21 to be shown; and that therefore the continuity of the said lateral portion 20 will not be impaired by the intervening darkened portion 21. In this manner, the width of the picture is not reduced, in fact the same may be increased to the extent of the lateral displacement.

It will be understood, also, that a master positive once having been obtained any number of films may be derived therefrom by making a master negative in the usual manner and from which in turn the desired positives for general distribution may be printed.

I claim:

1. A picture film or strip having a series of complete pictures arranged longitudinally thereof in pairs of similar pictures representing simultaneous aspects of a relatively moving object from different viewpoints, the two pictures of a pair being aligned longitudinally so that corresponding points in a predetermined focal plane of each pair will coincide in the superpositioning of a pair during projection.

2. A picture film or strip having a series of complete pictures arranged longitudinally thereof in pairs of similar pictures representing simultaneous aspects of a relatively moving object from different viewpoints, the two pictures of a pair being displaced laterally to longitudinally align the two pictures of each pair so that corresponding points in a predetermined focal plane of each pair will coincide in the superpositioning of a pair during projection.

3. A picture film or strip having a series of complete pictures arranged longitudinally thereof in pairs of similar pictures and taken simultaneously from different points, the two pictures of a pair being aligned longitudinally so that corresponding points in a predetermined focal plane of each pair will coincide in the superpositioning of a pair during projection and the overhanging side portions remaining for projection.

4. A picture film or strip having a series of complete pictures arranged longitudinally thereof in pairs of similar pictures and taken simultaneously from different points, the two pictures of a pair being aligned longitudinally so that corresponding points in a given focal plane of each pair will coincide in the superpositioning of a pair during projection and the alternate, opposite overhanging side portions being opaque.

5. In the stereoscopic projection of pictures: photographing, in continuous succession and in pairs as complete pictures and simultaneously, the subject from two separated points upon sensitized surfaces and preparing negatives therefrom, providing a positive from said negatives by arranging thereon the pairs longitudinally thereof, and by displacing the respective pictures of a pair laterally of said positive to cause the respective points of a predetermined focal plane of each pair to coincide when superposed in projection.

6. In the stereoscopic projection of pictures: photographing, in continuous succession and in pairs as complete pictures and simultaneously, the subject from two separated points upon sensitized surfaces and preparing negatives therefrom, providing a positive from said negatives by arranging thereon the pairs longitudinally thereof and by displacing the respective pictures of a pair laterally of said positive to cause the respective points of a predetermined focal plane of each pair to coincide when superposed in projection, and projecting same upon a screen.

7. In the stereoscopic projection of pictures; photographing, in pairs as complete pictures and simultaneously, the subject from two separated points upon sensitized surfaces and preparing negatives therefrom, providing a positive from said negatives by arranging the pairs thereon longitudinally thereof, and by displacing the respective pictures of a pair laterally of said positive to cause the respective points of a predetermined focal plane of each pair to coincide when superposed in projection, and projecting same upon a screen, the period of projection of one picture of a pair being less than that of the other.

8. In the stereoscopic projection of pictures: photographing, in pairs as complete pictures and simultaneously, the subject from two separated points upon sensitized surfaces and preparing negatives therefrom, providing a positive from said negatives by arranging the pairs thereon longitudinally thereof, and by displacing the respective pictures of a pair laterally of said positive to cause the respective points of a predetermined focal plane of each pair to coincide when superposed in projection, rendering opaque alternate and opposite overhanging side portions, and projecting the positive upon a screen.

9. In the stereoscopic projection of pictures: photographing, in pairs as complete pictures and simultaneously, the subject from two separated points upon sensitized surfaces and preparing negatives therefrom, providing a positive from said negatives by arranging thereon the pairs longitudinally thereof, and by displacing the respective pictures of a pair laterally of said positive to cause the respective points of a predetermined focal plane of each pair to coincide when superposed in projection, rendering opaque alternate and opposite overhanging side portions, and projecting the positive upon a screen, the period of projection of one picture of a pair being less than that of the other.

Signed at New York, in the county of New York and State of New York, this 7th day of May, A. D. 1920.

CHARLES P. MÜLLER.